(12) United States Patent
Tao et al.

(10) Patent No.: US 10,346,362 B2
(45) Date of Patent: Jul. 9, 2019

(54) SPARSE FILE ACCESS (71) Applicant: Oracle International Corporation, Redwood Shores, CA (US)

(72) Inventors: Zuoyo Tao, Belmont, CA (US); Nilesh Choudhury, Redwood City, CA (US); Scott Martin, Santa Cruz, CA (US); Mingmin Chen, Belmont, CA (US); Jia Shi, Burlingame, CA (US); Alexander Tsukerman, Foster City, CA (US); Kothanda Umamageswaran, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 500 days.

(21) Appl. No.: 14/849,012

(22) Filed: Sep. 9, 2015

(65) Prior Publication Data
US 2016/0092454 A1    Mar. 31, 2016

Related U.S. Application Data (60) Provisional application No. 62/055,782, filed on Sep. 26, 2014.

(51) Int. Cl.
G06F 16/174       (2019.01)
G06F 17/30        (2006.01)

(52) U.S. Cl.
CPC .... *G06F 16/1744* (2019.01); *G06F 17/30153* (2013.01)

(58) Field of Classification Search
CPC ............. G06F 11/1461; G06F 11/1451; G06F 17/30584; G06F 17/30595

USPC .................................................. 707/654, 658
See application file for complete search history.

(56) References Cited

U.S. PATENT DOCUMENTS

| | | |
|---|---|---|
| 5,564,037 A | 10/1996 | Lam |
| 5,953,729 A * | 9/1999 | Cabrera ............ G06F 17/30067 |
| 7,010,663 B2 | 5/2006 | George et al. |
| 7,475,098 B2 | 1/2009 | Patterson |
| 9,239,869 B1 * | 1/2016 | Zhang ............... G06F 17/30575 |
| 9,575,849 B2 | 2/2017 | Mittal |
| 2003/0074492 A1 * | 4/2003 | Cochran ................. G06F 3/061 |
| | | 710/5 |
| 2003/0158863 A1 | 8/2003 | Haskin |

(Continued)

OTHER PUBLICATIONS

Free Software Foundation, Inc. "GNU Tar: an Archiver Tool." Sep. 24, 2013, accessed Oct. 19, 2017 from <www.gnu.org/software/tar/manual/html_node/index.html>.*

(Continued)

*Primary Examiner* — Robert E Beausoliel, Jr.
*Assistant Examiner* — Arthur Ganger
(74) *Attorney, Agent, or Firm* — Hickman Palermo Becker Bingham LLP (57) ABSTRACT

Techniques herein are for accessing non-materialized blocks of a sparse file. A method involves a storage system receiving a storage command to access a sparse file. A combined content of a set of materialized blocks and a header that identifies one or more non-materialized blocks is assembled. The combined content does not comprise a content of the one or more non-materialized blocks. Responsive to the assembling, the combined content is transferred between the storage system and a computer system.

20 Claims, 7 Drawing Sheets

(56) References Cited

U.S. PATENT DOCUMENTS

| | | | |
|---|---|---|---|
| 2004/0268068 A1* | 12/2004 | Curran | G06F 11/1451 |
| | | | 711/162 |
| 2005/0246397 A1 | 11/2005 | Edwards | |
| 2006/0179261 A1 | 8/2006 | Rajan | |
| 2008/0072003 A1 | 3/2008 | Vu | |
| 2008/0162491 A1 | 7/2008 | Becker | |
| 2008/0162842 A1* | 7/2008 | Boutcher | G06F 3/0608 |
| | | | 711/161 |
| 2008/0244028 A1 | 10/2008 | Le | |
| 2010/0250499 A1 | 9/2010 | McAlister | |
| 2011/0191296 A1 | 8/2011 | Wall | |
| 2011/0307447 A1* | 12/2011 | Sabaa | H04L 67/2842 |
| | | | 707/637 |
| 2012/0017060 A1 | 1/2012 | Kapanipathi | |
| 2013/0054531 A1 | 2/2013 | Susairaj | |
| 2013/0103644 A1 | 4/2013 | Shoens et al. | |
| 2013/0297722 A1* | 11/2013 | Wright | G06F 11/1469 |
| | | | 709/217 |
| 2013/0311520 A1* | 11/2013 | Nakagawa | G06F 3/0607 |
| | | | 707/812 |
| 2014/0006354 A1 | 1/2014 | Parkinson | |
| 2014/0258239 A1 | 9/2014 | Amlekar | |
| 2015/0019909 A1 | 1/2015 | Griffith | |
| 2015/0120780 A1 | 4/2015 | Jain | |
| 2015/0154105 A1* | 6/2015 | Chaurasia | G06F 3/0608 |
| | | | 711/154 |
| 2015/0254240 A1 | 9/2015 | Li | |
| 2015/0370641 A1 | 12/2015 | Susairaj et al. | |
| 2016/0092534 A1 | 3/2016 | Choudhury et al. | |
| 2016/0110292 A1* | 4/2016 | Choi | G06F 12/0866 |
| | | | 711/103 |
| 2016/0171029 A1* | 6/2016 | Sanvido | G06F 17/30324 |
| | | | 707/745 |
| 2018/0075041 A1 | 3/2018 | Susairaj | |

OTHER PUBLICATIONS

Warden, Tim. "Storage Pooling, Thin Provisioning and Over-Subscription." Las Solanas Consulting, Jul. 3, 2010. Accessed Oct. 19, 2017 from <www.las-solanas.com/storage_virtualization/thin_provisioning.php>.*

Walrond, Dan. "Using Netcat and Tar to Quickly Transfer Files between Machines, Aka Tar Pipe." N.d. Accessed Oct. 19, 2017 from <web.archive.org/web/20130925161957/http://toast.djw.org.uk/tarpipe.html>.*

Haynes, T. "Network File System (NFS) Version 4 Minor Version 2 Protocol." IETF Tools, May 17, 2014. Accessed Oct. 6, 2017 from <tools.ietf.org/html/draft-ietf-nfsv4-minorversion2-24>.*

Susauraj, U.S. Appl. No. 14/313,926, filed Jun. 24, 2014, Office Action, dated Feb. 23, 2017.

Lee U.S. Appl. No. 14/692,602, filed Apr. 21, 2015, Notice of Allowance, dated Jun. 30, 2017.

Choudhury, U.S. Appl. No. 14/823,212, filed Aug. 11, 2015, Interview Summary, dated Jun. 6, 2018.

Susairaj, U.S. Appl. No. 14/313,926, filed Jun. 24, 2014, Office Action, dated Nov. 2, 2017.

Choudhury, U.S. Appl. No. 14/823,212, filed Aug. 11, 2015, Office Action, dated Sep. 28, 2017.

U.S. Appl. No. 14/823,212, filed Aug. 11, 2015, Office Action, dated Apr. 23, 2018.

* cited by examiner

SPARSE FILE ACCESS

CROSS-REFERENCE TO RELATED APPLICATIONS; BENEFIT CLAIM

This application claims the benefit of U.S. Provisional Application No. 62/055,782 entitled Sparse Griddisks, filed Sep. 26, 2014, the contents of which are incorporated by reference for all purposes as if fully set forth herein.

TECHNICAL FIELD

Embodiments relate generally to techniques for accessing sparse files. Specific techniques are included that use identifiers of non-materialized blocks to minimize data transfer.

BACKGROUND

A block oriented storage device, such as a disk drive, may store a file in fixed size fragments known as blocks. Each block may have a physical block address that never changes, a logical block address that remains constant while the block is allocated but may change between allocations of the block, and a virtual block address that identifies the block across multiple storage devices.

A storage device has a finite storage capacity defined by a quantity of physical blocks and identified by a range of physical block addresses. A storage device also has a range of logical block addresses, which may exceed the physical capacity of the storage device. As such, a logical block address may or may not identify a physical block.

A materialized block is a block that contains actual data. An ordinary file is composed solely of materialized blocks. A non-materialized block is a block that has a logical block address but no corresponding physical storage. As such, non-materialized blocks may be allocated and used without consuming physical storage.

A sparse file may be composed of materialized blocks and/or non-materialized blocks. As such, the virtual size of a sparse file may exceed the physical capacity of the storage device on which it resides. Creation of a sparse file having only non-materialized blocks may be fast because no physical storage activity is needed, except perhaps for storage of some minimal metadata.

A storage system is composed of storage devices and manages an external interface for exchanging blocks between the storage devices and involved clients according to storage commands, such as read requests and write requests. This external interface may pass non-materialized blocks in the same way as materialized blocks.

Because all blocks of a storage device share a fixed size, the external interface sends or receives, for each block transferred, a large and fixed amount of data, such as 64 kilobytes. The external transfer of much data occurs, even if a block is not materialized. External transfer of a non-materialized block involves sending a full-sized data block that is filled with a bit pattern that is reserved to indicate non-materialization, such as with a repeating magic number.

Except for merely indicating that a block is non-materialized, the reserved bit pattern has no information content and is otherwise useless. Regardless of whether a non-materialized block is read or written, traditionally the whole 64 kilobytes filled with the reserved bit pattern must be sent, possibly over a computer network of limited capacity and prone to contention that erodes aggregate throughput.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 Example Sparse File Access System
    2.1 Sparse Read
    2.2 Sparse Write
    3.0 Sparse Read Process
    4.0 Sparse Write Process
    5.0 Thin Provisioning
    6.0 Metadata
    7.0 Hardware Overview
    8.0 Extensions and Alternatives 1.0. General Overview Techniques are described herein for accessing non-materialized blocks of sparse files. In an embodiment, a computer system sends, to a storage system, a storage command to access a sparse file. The storage system executes the storage command and replies appropriately to the computer system. If the storage command is a read request, then the storage system assembles content that combines a set of materialized blocks and a header that identifies one or more non-materialized blocks. The storage system replies to the read request by sending the combined content to the computer system.

If the storage command is a write request, then the computer system assembles content that combines a set of materialized blocks and a header that identifies one or more non-materialized blocks. The computer system includes the combined content in the write request. Regardless of whether the storage command is a write request or a read request, the combined content does not have content of the one or more non-materialized blocks.

2.0 Example Sparse File Access System

Figure 1A:
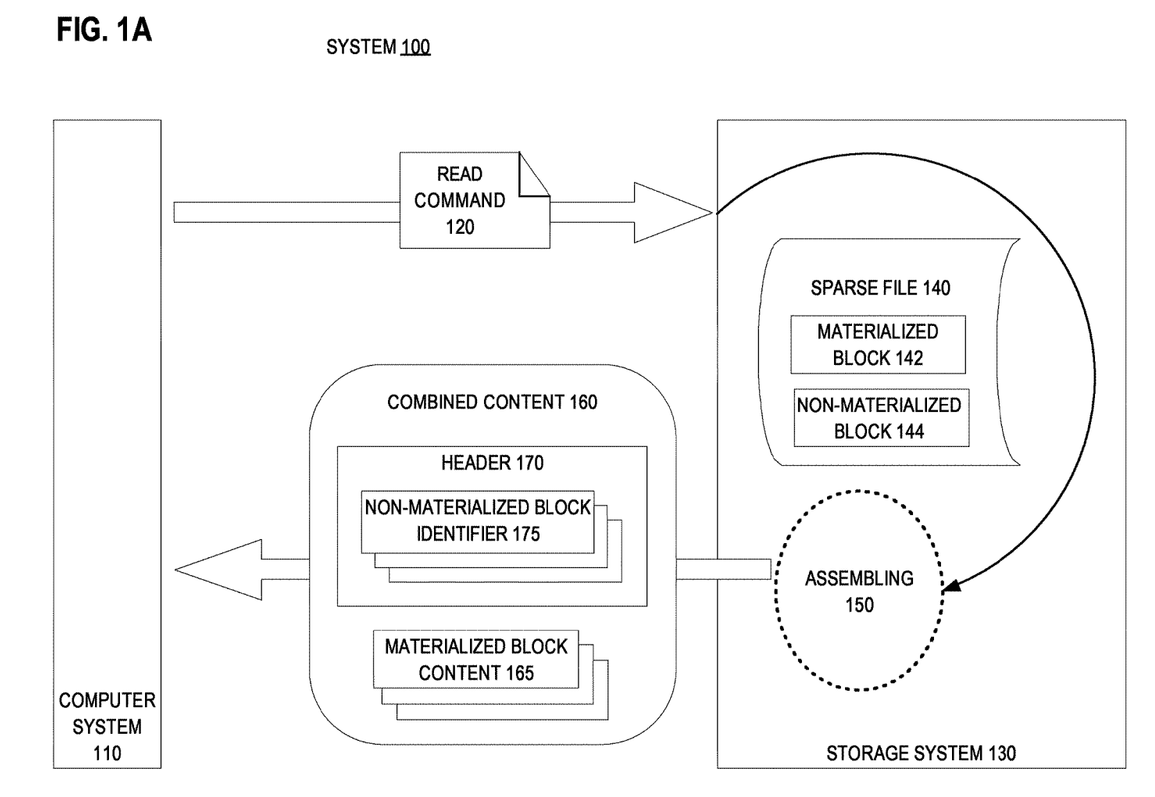
FIG. 1A is a logical block diagram illustrating an example system for transferring non-materialized blocks in which certain techniques described herein may be implemented, according to various embodiments.
Figure 1B:
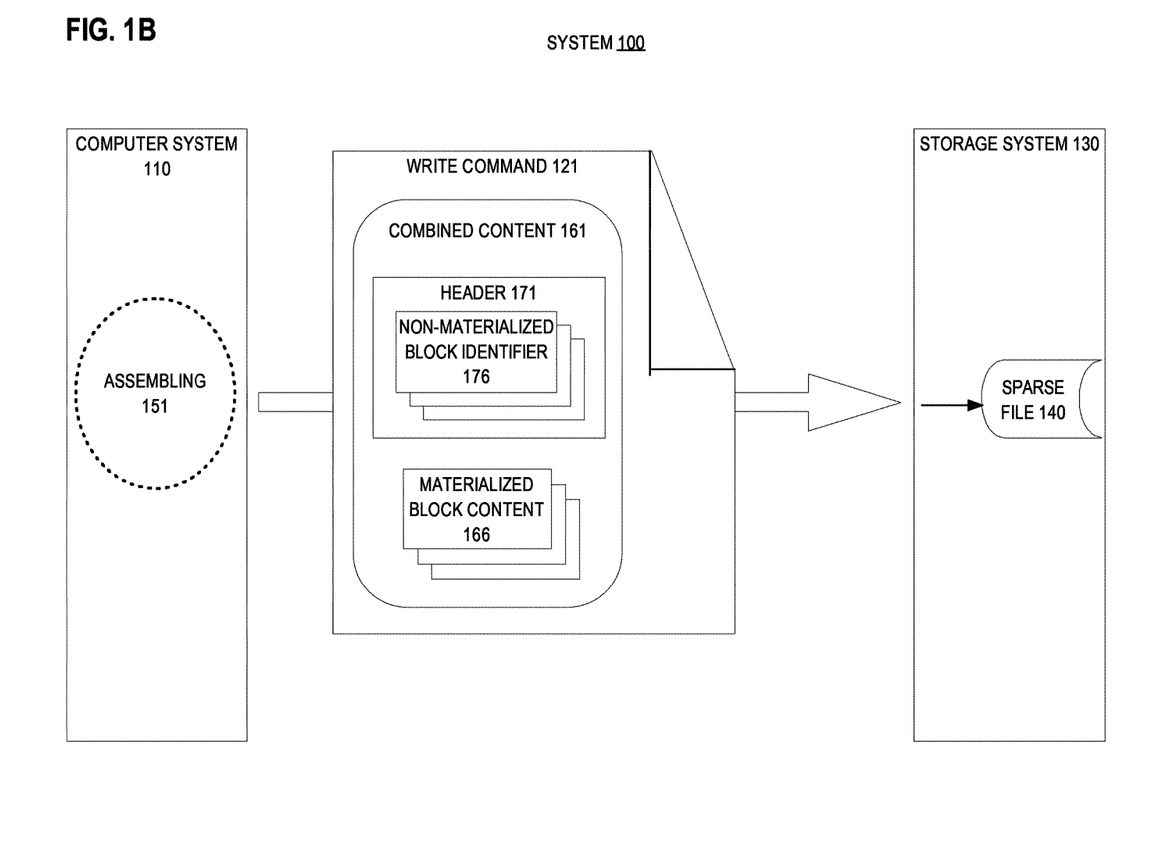
FIG. 1B is a logical block diagram illustrating an example system for transferring non-materialized blocks in which certain techniques described herein may be implemented, according to various embodiments.

FIGS. 1A and 1B illustrate block diagrams of example system 100 that performs sparse file access, in which techniques described herein may be practiced. FIG. 1A depicts a read command. FIG. 1B depicts a write command. System 100 comprises computer system 110 and storage system 130. Although not shown, storage system 130 may comprise one or more storage devices, each of which may be a disk drive, a flash memory, or other non-volatile memory. Although not shown, storage system 130 may also include one or more computers or controllers, such as a storage manager or drive controller, to manage client interactions, translate block addresses as needed, and manage a data lifecycle such as replication, performance tiers, wear conditioning, metadata, and error correction.

A storage device is a block mode device. A block mode device provides a client access to data in units referred to as a data block. A data block is the atomic unit of data from primary storage that a storage device client may request from a storage device.

Each storage device has a logical address space that identifies a range of data blocks. The logical address space has logical block addresses that may reference more data blocks than the storage device can actually store. The address spaces of two storage devices may be unrelated, such that a given logical block address may be within the address spaces of one or both of the storage devices.

Storage system 130 includes data files that are composed of data blocks. Among the data files of storage system 130 are one or more sparse files, such as sparse file 140. Sparse file 140 may contain a mix of materialized and non-materialized blocks, such as non-materialized block 144 and materialized block 142. Materialized block 142 has actual data in physical storage. Non-materialized block 144 has a logical block address, but no corresponding physical storage.

Computer system 110 may comprise one or more computers that access files of storage system 130. Computer system 110 may have a rack computer such as a blade server, a personal computer, a smartphone, or a mainframe computer. Computer system 110 may host a database management system, other middleware, or other application. Computer system 110 and storage system 130 are communicatively coupled by a local area network (LAN), a wide area network (WAN) such as the global Internet, a rack backplane, a motherboard, optic or metallic cable, wireless link, other communication link, or some series of these.

2.1 Sparse Read

In operation, computer system 110 sends read command 120 to storage system 130 to retrieve data blocks from sparse file 140. Read command 120 may be a small computer system interface (SCSI) command or a retrieval request according to another storage protocol. Read command 120 may identify particular data blocks to retrieve.

Storage system 130 processes read command 120 by retrieving requested data blocks from physical storage. Storage system 130 need only retrieve requested materialized blocks. Non-materialized blocks do not occupy physical storage, but instead are identified only in metadata stored in memory or storage.

Responsive to read command 120, storage system 130 assembles requested data into combined content 160, shown as assembling 150. For example, storage system 130 may allocate a memory buffer in which to compose combined content 160. Storage system 130 may copy the contents of retrieved materialized blocks 142 into the buffer, perhaps contiguously or according to some particular arrangement, and shown as materialized block content 165.

Storage system 130 also generates header 170 within combined content 160. Header 170 may contain metadata that regards combined content 160, storage system 130, or read command 120. Within header 170 and during assembling 150, storage system 130 indicates which non-materialized blocks 144 were read. Because non-materialized blocks 144 lack content, combined content 160 does not contain actual data blocks of content for non-materialized blocks 144. Instead, storage system 130 includes within header 170 a non-materialized block identifier 175 for each non-materialized block 144 that was requested in read command 120. Alternatively, header 170 may contain a bitmap or other dense structure that indicates which requested blocks are non-materialized and for which combined content 160 does not have actual data block content.

After assembly of combined content 160, storage system 130 transfers combined content 160 to computer system 110. For example, storage system 130 may answer read command 120 by sending computer system 110 a message or other response that includes combined content 160 as requested.

By convention, computer system 110 understands the structure of combined content 160 and header 170. As such, computer system 110 understands that each non-materialized block identifier 175 is sent in lieu of a data block content filled with a bit pattern that would have been traditionally reserved to indicate a non-materialized block. Sending non-materialized block identifier 175, instead of a pattern filled block, amounts to a significant reduction in payload size to convey the same meaning. This space savings can reduce latency, increase throughput, and save electricity for a storage transfer that involves non-materialized blocks.

Computer system 110 may perform additional processing for non-materialized block identifiers 175. For example, computer system 110 may synthesize a data block for each non-materialized block identified in header 170. Computer system 110 may fill each synthesized data block with a bit pattern that indicates non-materialization, such as a repeating magic number. Data block synthesis may assist a client that understands a fill pattern for non-materialization but does not understand header 170.

In an embodiment, sparse file 140 may be backed by a parent file that provides content for data blocks that are not materialized within sparse file 140. Computer system 110 or storage system 130 may retry reading data blocks indicated by non-materialized block identifiers 175 from the parent file. As such, system 100 may initially read sparse file 140 to retrieve materialized blocks 142 and subsequently read the parent file to retrieve contents of data blocks that are only materialized in the parent file and that correspond to non-materialized blocks 144.

2.2 Sparse Write

FIG. 1B illustrates example system 100 with a write command involving a mix of materialized and non-materialized blocks to be written to a sparse file. In operation, computer system 110 initially assembles combined content 161, shown as assembling 151. For example during assembling 151, computer system 110 may allocate a memory buffer in which to compose combined content 161. Computer system 110 may copy the contents of materialized blocks into the buffer, perhaps contiguously or according to some particular arrangement, and shown as materialized block content 166.

Computer system 110 also generates header 171 within combined content 161. Header 171 may contain metadata that regards combined content 161, computer system 110, or write command 121. Within header 171 and during assembling 151, computer system 131 indicates which non-materialized blocks should be written. Because non-materialized blocks lack content, combined content 161 does not contain actual data blocks of content for non-materialized blocks. Instead, computer system 110 includes within header 171 a non-materialized block identifier 176 for each non-materialized block that is to be written by write command 121. Alternatively, header 171 may contain a bitmap or other dense structure that indicates which writable blocks are non-materialized and for which combined content 161 does not have actual data block content.

After assembly of combined content 161, computer system 110 transfers combined content 161 to storage system 130. For example, computer system 110 may deliver write command 121 by sending computer system 110 a message that includes combined content 161.

Storage system 130 processes write command 121 by writing materialized block content 166 into sparse file 140 at the appropriate block locations. Storage system 130 may process non-materialized block identifiers 176 without writing block content to disk. For example because a non-materialized block lacks content, only metadata may need writing to sparse file 140.

3.0 Sparse Read Process

Figure 2A:
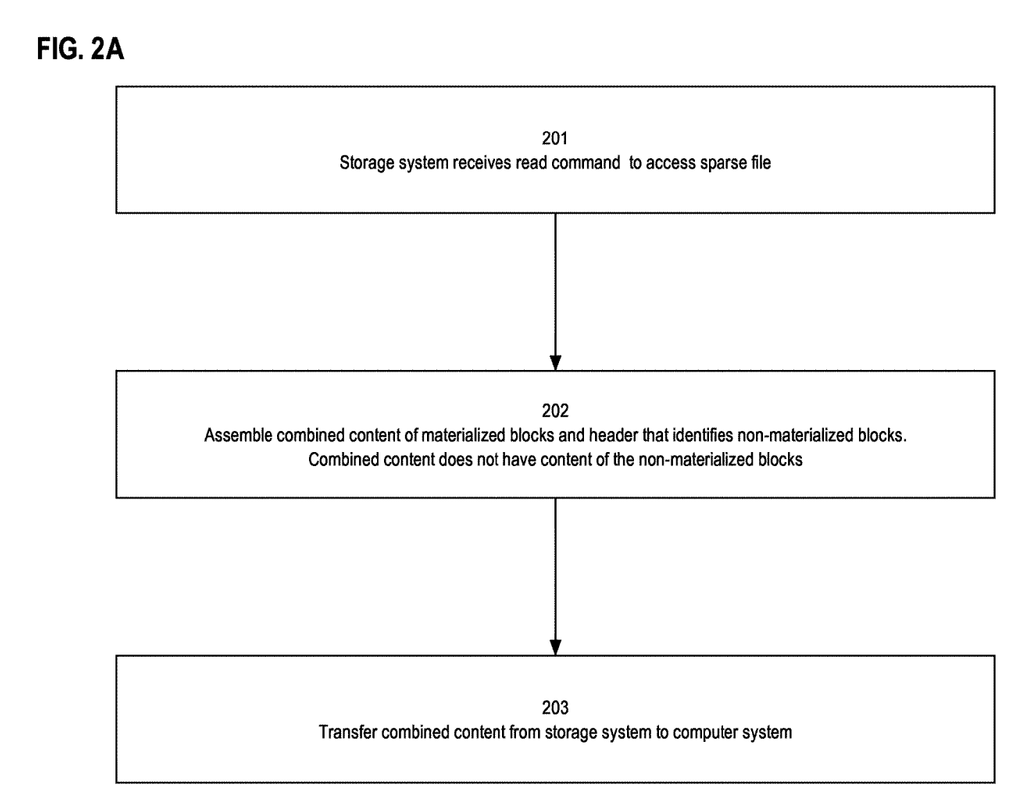
FIG. 2A illustrates an example process for reading non-materialized blocks, according to an embodiment.

FIG. 2A depicts a flow diagram of an example process for performing a read of a sparse file. For illustrative purposes, FIG. 2A is discussed in relation to FIG. 1A.

In step 201, a storage system receives a command to read data blocks from a sparse file. For example, computer system 110 sends read command 120 to storage system 130. Read command 120 may identify which data blocks should be retrieved from sparse file 140. Read command 120 may be issued in fulfillment of part of a database query, such as a table scan. Read command 120 may identify particular data blocks or a range of data blocks. Read command 120 may identify a data block by specifying a virtual block address, a logical block address, or a physical block address.

Computer system 110 may send read command 120 in a network message, over an inter-process pipe or socket, or through a file system that is cross mounted or otherwise shared by computer system 110 and storage system 130. Computer system 110 may send read command according to a transport protocol, such as hypertext transfer protocol (HTTP) or file transfer protocol (FTP).

In step 202, the storage system assembles the retrieved content. For example, storage system 130 may retrieve desired materialized blocks from physical storage. Storage system 130 may retrieve data blocks from a cache based on volatile memory, a cache based on non-volatile memory such as flash, a solid state drive, a disk, or other storage device. During assembling 150, storage system 130 may generate combined content 160 within a dynamically allocated memory buffer or a reusable memory buffer acquired from a pool. Storage system 130 copies the contents of materialized blocks 142 into materialized block content 165 of combined content 160. Storage system 130 constructs header 170 within combined content 160. Into header 170, storage system 130 writes non-materialized identifiers 175 to indicate which requested data blocks are not-materialized and so lack content.

In step 203, combined content is transferred from the storage system to the computer system. For example, combined content 160 may reside in a memory buffer that storage system 130 transmits to computer system 110 as a response to read command 120. Upon receipt of combined content 160, computer system 110 may perform additional processing for non-materialized block identifiers 175. For example, computer system 110 may synthesize a data block for each non-materialized block identified in header 170. Computer system 110 may fill each synthesized data block with a bit pattern that indicates non-materialization, such as a repeating magic number.

4.0 Sparse Write Process

Figure 2B:
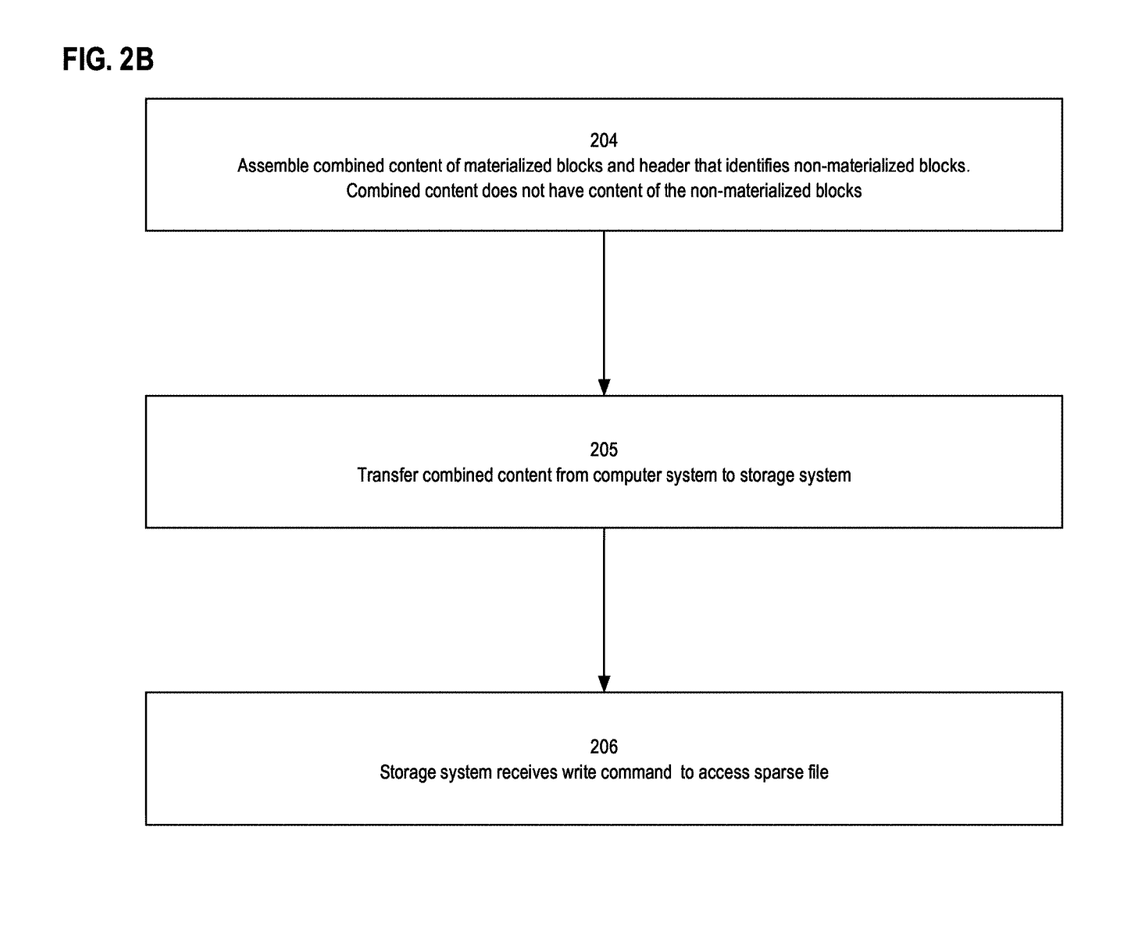
FIG. 2B illustrates an example process for writing non-materialized blocks, according to an embodiment.

FIG. 2B depicts a flow diagram of an example process for performing a write to a sparse file. For illustrative purposes, FIG. 2B is discussed in relation to FIG. 1B.

In step 204, a computer system assembles content to be written to storage. For example during assembling 151, computer system 110 may generate combined content 161 within a dynamically allocated memory buffer or a reusable memory buffer acquired from a pool. Computer system 110 copies materialized block content 166 into combined content 161. Computer system 110 constructs header 171 within combined content 161. Into header 171, computer system 110 writes non-materialized identifiers 176 to indicate which writable data blocks are not-materialized and so lack content. Combined content 161 may identify which data blocks should be written with materialized block content 166, perhaps by including block addresses within combined content 161. Computer system 110 may format or otherwise clear a data block by including a block address of the data block in non-materialized block identifiers 176.

In step 205, combined content is transferred from the computer system to the storage system. For example, computer system 110 may send combined content 161 in write command 121 to storage system 130.

In step 206, the storage system receives the write command to store data blocks in a sparse file. For example if storage system 130 is saturated during a demand spike or busy with internal maintenance, storage system 130 may queue write command 121 in memory for later processing. While write command 121 is queued, storage system 130 may coalesce repeated writes to a same block address. Storage system 130 stores materialized block content 166 into appropriate physical blocks of sparse file 140. Storage system 130 updates durable metadata of sparse file 140 to note that data blocks for non-materialized block identifiers 176 are written but do not have data. Storage system 130 may perform replication to increase availability of data blocks written by write command 121, perhaps according to a redundant array of independent disks (RAID) level or other federation paradigm.

5.0 Thin Provisioning

Figure 3:
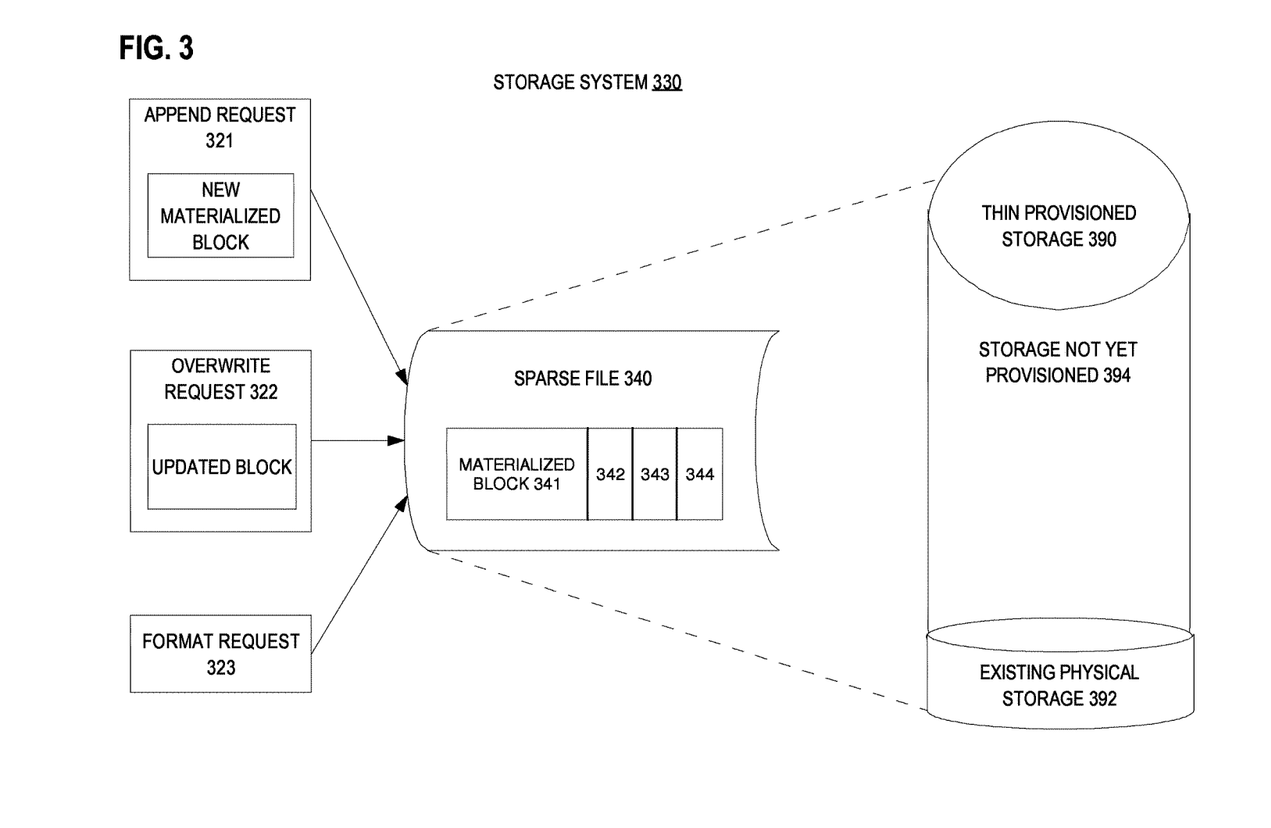
FIG. 3 is a logical block diagram illustrating an example storage system in which certain techniques described herein may be implemented, according to various embodiments.

FIG. 3 illustrates example storage system 330 with various write commands involving a mix of materialized and non-materialized blocks to be written to a sparse file. Storage system 330 may be an implementation of storage system 130. Storage system 330 includes thin provisioned storage 390. Thin provisioned storage 390 uses storage virtualization to manage logical block addresses beyond the physical capacity of the corresponding storage hardware.

Sparse file 340 occupies thin provisioned storage 390. Sparse file 340 may contain a mix of materialized and non-materialized blocks, such as materialized block 341 and non-materialized blocks 342-344. Sparse file 340 may be sized to a given virtual size that exceeds the physical capacity of thin provisioned storage 390. Sparse file 340 may contain a block address range that exceeds the amount of physical blocks dedicated to sparse file 340.

Although sparse file 340 may have a huge virtual size, sparse file 340 may contain few materialized blocks. As such, the physical storage footprint of sparse file 340 may be small enough to physically fit within existing physical storage 392, which is the available physical storage capacity. Over time, the contents of sparse file 340 may grow as data naturally accumulates. During such growth, thin provisioned storage 390 dedicates physical blocks from within existing physical storage 392 as needed to materialize blocks and accommodate new data.

When existing physical storage 392 nears exhaustion, storage system 330 may issue an alert that warns an administrator to add more disk drives to thin provisioned storage 390. These additional disk drives are eventually used to materialize additional blocks that occur within the block address range of storage not yet provisioned 394. In essence, sparse file 340 may be virtually oversized beyond the physical capacity of thin provisioned storage 390, and then an administrator may add storage capacity dynamically, in a just in time fashion. This reduces the initial capital cost of creating a virtually huge sparse file 340 because capital spending can be deferred until incrementally needed.

In operation, storage system may receive any of various write commands 321-323 when physical storage is exhausted. For instance, format request 323 can be handled by storage system 330 because it can add an additional data block to sparse file 340 without consuming a physical block. Format request 323 identifies logical blocks for formatting. Because formatting clears a data block, storage system 330 may satisfy format request 323 merely by reserving a block address for a non-materialized block and perhaps storing some metadata. As such, storage system 330 may execute format request 323 without consuming a physical block. Likewise, storage system 330 may execute any write command that writes only non-materialized blocks without consuming a physical block.

The ability of storage system 330 to execute some write commands without consuming physical storage confers extraordinary robustness upon storage system 330 while physical storage is exhausted. For example, any storage system whose physical capacity is exhausted is unable to accept writes that consume physical storage. If a traditional storage system is physically exhausted and receives a write command that needs more physical storage, then the traditional storage system will do two things. First, the traditional storage system would reject the write command.

However because physical storage is oversubscribed, the traditional storage system also responds to the rejected write command by taking an exhausted storage device out of service, pending administrative maintenance such as deleting unwanted files. As a consequence and until maintenance occurs, the storage device cannot accept additional write commands.

Whereas upon exhaustion, storage system 330 need not take thin provisioned storage 390 out of service. Thin provisioned storage 390 can continue to accept some write commands. Append request 321 and overwrite request 322 in sequence illustrate the robustness of storage system 330.

Append request 321 tries to append an additional materialized block to sparse file 340. If existing physical storage 392 is exhausted, storage system 330 rejects append request 321 because no physical block is available to accommodate append request 321. Storage system 330 may notify a client system that append request 321 has failed for lack of physical space. However, storage system 330 does not responsively take thin provisioned storage 390 out of service and allows some subsequent write commands, such as overwrite request 322.

Overwrite request 322 bears updated content to replace the content of an already stored materialized block. As such, overwrite request 322 does not need an additional physical block, but instead merely reuses a physical block that is already part of sparse file 340, such as materialized block 341. Even though existing physical storage 392 is exhausted, storage system 330 can successfully execute overwrite request 322.

Furthermore while existing physical storage 392 is exhausted, storage system 330 may subsequently receive format request 323 or a request to write a non-materialized block. So long as an additional physical block is not needed, storage system 330 can successfully execute such a subsequent write command. In this manner, the content of thin provisioned storage 390 remains somewhat mutable and useful while an administrator adds a new drive or otherwise expands the physical capacity of thin provisioned storage 390.

6.0 Metadata

Figure 4:
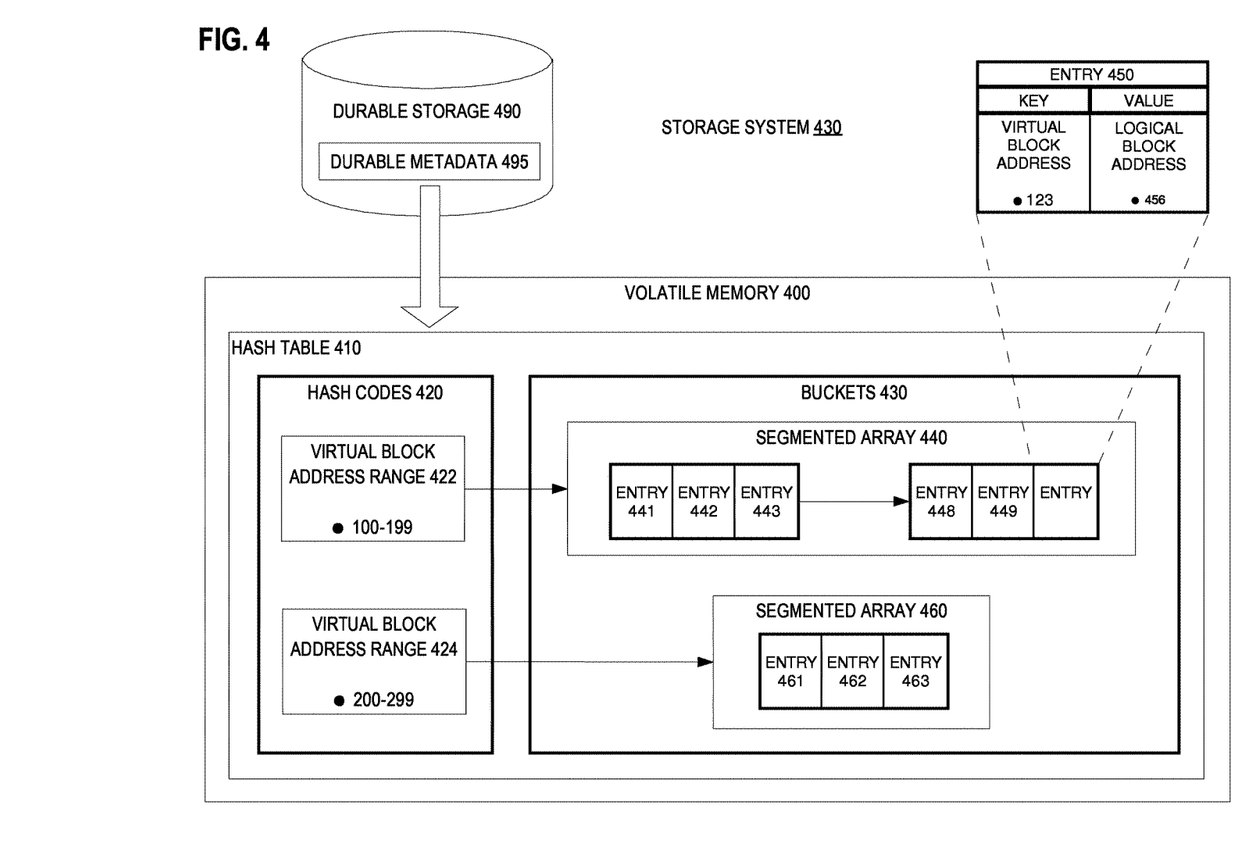
FIG. 4 is a logical block diagram illustrating an example storage system in which certain techniques described herein may be implemented, according to various embodiments.

FIG. 4 illustrates example storage system 430 with tiered metadata. Storage system 430 may be an implementation of storage system 130. Storage system 430 includes volatile memory 400 and durable storage 490.

Durable storage 490 may have at least one storage device, such as a tape drive, a disk drive, a solid state drive, or other nonvolatile memory such as a flash module. Each storage device of durable storage 490 is a block oriented device that durably records data blocks. In addition to data block content, durable storage 490 also stores durable metadata 495 that describes the data blocks of durable storage 490.

Durable metadata 495 may include data for translating logical block addresses to physical block addresses or vice versa. Durable metadata 495 may also have a manifest of non-materialized blocks. Durable metadata 495 may also have file system metadata, such as index nodes (inodes) or a file allocation table (FAT). Durable metadata 495 may be distributed across header regions of payload data blocks or consolidated in a special region of a storage medium.

Storage system 430 may use durable metadata 495 to manage the physical blocks of each storage device. Because durable metadata 495 occupies durable storage 490, durable metadata 495 survives power cycles. However, durable storage 490 may be relatively slow compared to volatile random access memory (RAM), such as volatile memory 400, which may be a static or dynamic RAM. As such, storage system 430 may cache a representation of durable metadata 495 in volatile memory 400.

Within volatile memory 400, storage system 430 maintains a data structure that is optimized for high performance. This data structure includes hash table 410 which operates as an associative array that maps virtual block addresses to logical block addresses, as needed to access data blocks of durable storage 490.

Hash table 410 contains information gleaned from durable metadata 495 in a distilled format. Because hash table 410 occupies volatile memory that is erased when powered down, storage system 430 rebuilds hash table 410 from durable metadata 495 each time storage system 430 is power cycled.

Hash table 410 contains buckets 430 and hash codes 420. Each of hash codes 420 may be generated from a virtual block address based on a repeatable computation, such as a mathematical formula. In this example, a hash code 420 may be computed by masking away insignificant digits of a virtual block address. For example, a virtual block address with a value of 123 may have its tens and hundreds digits cleared to derive a hash code 420 value of 100. As such, a same hash code 420 may be derived from different virtual block addresses.

For example, any virtual block address in a range of 100 to 199 yields a hash code 420 value of 100. This is shown as virtual block address range 422, which spans the range of 100 to 199. Likewise, virtual block address range 424 spans a range of 200-299.

During operation when storage system 430 receives a request to access a particular virtual block address, storage system 430 computes hash code 420 for that virtual block address to determine in which virtual block address range 422 or 424 does the virtual block address fit. For example, a virtual block address value of 123 hashes into virtual block address range 422.

Buckets 430 is composed of segmented arrays, such as segmented arrays 440 and 460. Each virtual block address range has a reference, such as a memory pointer, to a respective segmented array within buckets 430. For example, virtual block address range 422 refers to segmented array 440. As such, when storage system 430 needs to translate a virtual block address value of 123, then storage system 430 accesses virtual block range 422 and follows its reference to segmented array 440.

Within segmented array 440 is a logical block address to which the virtual block address value of 123 maps to. For example, clients may reference a data block according to a virtual block address, but storage system 430 must use hash table 410 to translate the virtual block address into a logical block address before accessing durable storage 490.

A segmented array is a data structure of dynamic capacity. Each segmented array stores entries in groups known as segments. A segment may have a fixed number of entries. In this example, each segment has three entries. For example, segmented array 460 has one segment, which has entries 461-463.

An advantage of a segmented array, versus a comparable data structure such as an ordinary array, is that the segmented array does not require contiguous memory for its footprint. As such, a segmented array can grow even when memory is fragmented and without a delay due to copying its existing entries from a memory region that the segmented array has outgrown to a newly allocated memory region.

If the segments of a segmented array do not have enough combined capacity to store an additional entry, then storage system 430 creates an additional segment for the segmented array. Storage system 430 arranges the segments of a segmented array into a linked list, such as shown in segmented array 440. To translate a virtual block address value of 123, storage system 430 traverses the linked list of segments within segmented array 440 until a matching entry is found.

As shown for entry 450, each entry contains a key and a value. The key is the virtual block address being translated by storage system 430. As such, traversal of the linked list of segments within segmented array 440 continues until entry 450 is reached, which has 123 as the value of its key and which matches the virtual block address being translated. Entry 450 also has a value, 456, which is the logical block address for storage system 430 to use when accessing a data block identified by a virtual block address value of 123.

Because hash table 410 maintains a centralized inventory of all allocated data blocks, hash table 410 may be enhanced to operate as a locking mechanism or mutex for each block. For example, when two storage commands regard a same block, processing of the first command may use hash table 410 to lock the given block. Processing of the second storage command may be suspended until processing of the first storage command is finished and the block is unlocked.

7.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
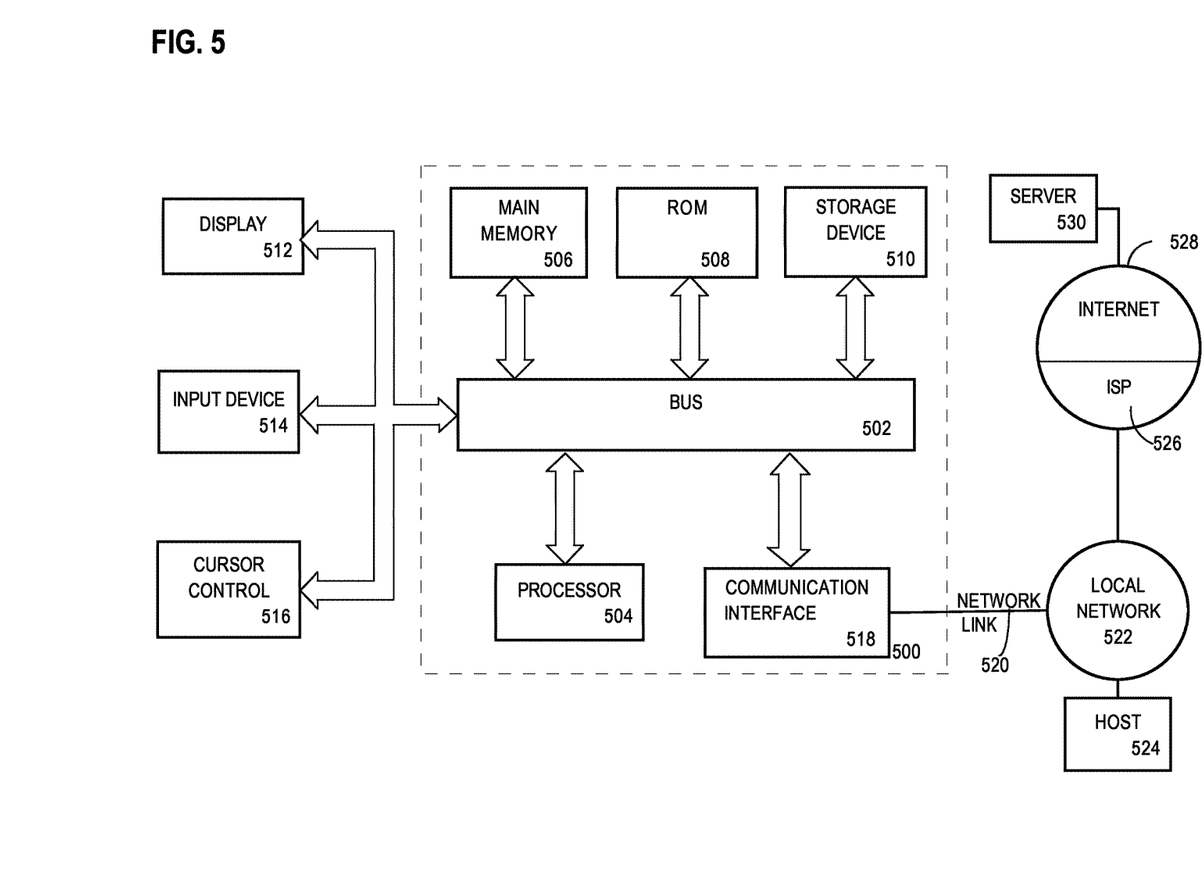
FIG. 5 is a block diagram illustrating one embodiment of a computer system suitable for implementing methods and features described herein.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a light emitting diode (LED) display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 822. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

8.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
a storage system receiving a storage command to access a sparse file;
assembling a combined content of a set of materialized blocks and a header that identifies a plurality of fixed-size non-materialized blocks, wherein:
the combined content does not comprise a content of the plurality of fixed-size non-materialized blocks, and
content of the plurality of fixed-size non-materialized blocks occupy no physical capacity of said storage system;
transferring, responsive to the assembling, the combined content, including respective identifiers of said plurality of fixed-size non-materialized blocks, from the storage system to a computer system.

2. The method of claim 1 further comprising, responsive to the transferring, the computer system processing the header to generate a sparse pattern, wherein the storage command comprises a read command, wherein the transferring comprises transferring the combined content from the storage system to the computer system, wherein the assembling is responsive to the receiving.

3. The method of claim 1 wherein the storage command comprises a write command, wherein the transferring comprises transferring the combined content from the computer system to the storage system, wherein the write command comprises the combined content, wherein the receiving is responsive to the assembling.

4. The method of claim 1 wherein receiving the storage command comprises receiving a first write command and a second write command, wherein the method further comprises:
 the storage system notifying the computer system that the first write command failed due to insufficient physical space;
 if executing the second write command does not require an additional physical space, then successfully executing the second write command after the notifying.

5. The method of claim 1 wherein the storage command is a request to perform one of: a write or a format, wherein the sparse file is thin provisioned in excess of available physical capacity of said storage system, wherein the storage command does not cause a block to become materialized.

6. The method of claim 1 further comprising, responsive to the receiving, processing storage metadata that maps virtual block identifiers, each of which identifies a block across multiple storage devices, to logical block identifiers, wherein the storage metadata resides only in volatile memory.

7. The method of claim 6 wherein the storage metadata is generated from durable metadata that maps logical blocks to virtual blocks.

8. The method of claim 7 wherein the durable metadata resides in durable storage during a reboot of the storage system.

9. The method of claim 6 wherein the storage metadata resides in a hash table comprising a plurality of buckets, wherein each bucket of the plurality of buckets comprises a segmented array.

10. One or more non-transitory computer readable media comprising instructions that when executed by one or more processors cause:
 a storage system receiving a storage command to access a sparse file;
 assembling a combined content of a set of materialized blocks and a header that identifies a plurality of fixed-size non-materialized blocks, wherein:
 the combined content does not comprise a content of the plurality of fixed-size non-materialized blocks, and
 content of the plurality of fixed-size non-materialized blocks occupy no physical capacity of said storage system;
 transferring, responsive to the assembling, the combined content, including respective identifiers of said plurality of fixed-size non-materialized blocks, from the storage system to a computer system.

11. The one or more non-transitory computer readable media of claim 10 wherein the instructions further cause, responsive to the transferring, the computer system processing the header to generate a sparse pattern, wherein the storage command comprises a read command, wherein the transferring comprises transferring the combined content from the storage system to the computer system, wherein the assembling is responsive to the receiving.

12. The one or more non-transitory computer readable media of claim 10 wherein the storage command comprises a write command, wherein the transferring comprises transferring the combined content from the computer system to the storage system, wherein the write command comprises the combined content, wherein the receiving is responsive to the assembling.

13. The one or more non-transitory computer readable media of claim 10 wherein receiving the storage command comprises receiving a first write command and a second write command, wherein the instructions further cause:
 the storage system notifying the computer system that the first write command failed due to insufficient physical space;
 if executing the second write command does not require an additional physical space, then successfully executing the second write command after the notifying.

14. The one or more non-transitory computer readable media of claim 10 wherein the storage command is a request to perform one of: a write or a format, wherein the sparse file is thin provisioned in excess of available physical capacity of said storage system, wherein the storage command does not cause a block to become materialized.

15. The one or more non-transitory computer readable media of claim 10 wherein the instructions further cause, responsive to the receiving, processing storage metadata that maps virtual block identifiers, each of which identifies a block across multiple storage devices, to logical block identifiers, wherein the storage metadata resides only in volatile memory.

16. The one or more non-transitory computer readable media of claim 15 wherein the storage metadata is generated from durable metadata that maps logical blocks to virtual blocks.

17. The one or more non-transitory computer readable media of claim 16 wherein the durable metadata resides in durable storage during a reboot of the storage system.

18. The one or more non-transitory computer readable media of claim 15 wherein the storage metadata resides in a hash table comprising a plurality of buckets, wherein each bucket of the plurality of buckets comprises a segmented array.

19. A storage system comprising:
 one or more block-oriented storage devices configured to store one or more sparse files,
 wherein each of the one or more sparse files is composed of a set of materialized blocks and a set of fixed-size non-materialized blocks;
 connected to the one or more block-oriented storage devices, a processor configured to:
 receive a read command to retrieve a plurality of fixed-size non-materialized blocks and a set of materialized blocks from one of the one or more sparse files;
 assemble a combined content of the set of materialized blocks and a header that identifies the plurality of fixed-size non-materialized blocks, wherein:
 the combined content does not comprise a content of the plurality of fixed-size non-materialized blocks, and
 content of the plurality of fixed-size non-materialized blocks occupy no physical capacity of said storage system;
 transfer, responsive to the assembling, the combined content, including respective identifiers of said plurality of fixed-size non-materialized blocks, to a computer system.

20. The storage system of claim 19 wherein the processor is further configured to:
 receive a write command to store a combined content of a set of materialized blocks and a header that identifies one or more fixed-size non-materialized blocks, wherein the combined content does not comprise a content of the one or more fixed-size non-materialized blocks;

store, responsive to the receiving the write command and into the one or more block-oriented storage devices, the set of materialized blocks and metadata that describes the one or more fixed-size non-materialized blocks.

\* \* \* \* \*

UNITED STATES PATENT AND TRADEMARK OFFICE
CERTIFICATE OF CORRECTION

PATENT NO. : 10,346,362 B2
APPLICATION NO. : 14/849012
DATED : July 9, 2019
INVENTOR(S) : Tao et al.

Page 1 of 1

It is certified that error appears in the above-identified patent and that said Letters Patent is hereby corrected as shown below:

On the Title Page

Column 1, under Inventors, Line 1, delete "Zuoyo" and insert -- Zuoyu --, therefor.

Column 2, under Primary Examiner, Line 1, delete "Robert E" and insert -- Robert W --, therefor.

Signed and Sealed this
Twenty-eighth Day of July, 2020

Andrei Iancu
*Director of the United States Patent and Trademark Office*